(12) United States Patent
Roberge (10) Patent No.: US 11,650,018 B2
(45) Date of Patent: May 16, 2023

(54) DUCT MOUNTED HEAT EXCHANGER

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 423 days.

(21) Appl. No.: 16/784,630

(22) Filed: Feb. 7, 2020

(65) Prior Publication Data
US 2021/0247152 A1 Aug. 12, 2021

(51) Int. Cl.
*F28F 9/02* (2006.01)
*F28F 27/02* (2006.01)
*F28F 9/22* (2006.01)
*F28F 1/10* (2006.01)

(52) U.S. Cl.
CPC ............. *F28F 9/027* (2013.01); *F28F 1/10* (2013.01); *F28F 9/22* (2013.01); *F28F 27/02* (2013.01)

(58) Field of Classification Search
CPC ...... F28F 9/027; F28F 1/10; F28F 9/22; F28F 27/02
USPC .......................................................... 165/153
See application file for complete search history.

(56) References Cited

U.S. PATENT DOCUMENTS

| | | | | |
|---|---|---|---|---|
| 2,479,071 A | * | 8/1949 | Henstridge | ........... F28D 7/0058 165/172 |
| 3,033,534 A | * | 5/1962 | Caughill | ................ F28F 3/025 165/145 |
| 3,064,947 A | * | 11/1962 | Wynne | ................. F28D 7/0058 165/149 |
| 3,638,719 A | | 2/1972 | McGann | |
| 3,735,588 A | * | 5/1973 | Moskowitz | ............. F28F 9/013 165/162 |
| 3,817,290 A | * | 6/1974 | Hilgemann | ............. F28D 1/047 285/125.1 |

(Continued)

FOREIGN PATENT DOCUMENTS

| | | |
|---|---|---|
| EP | 3431911 A1 | 1/2019 |
| EP | 3546873 A1 | 10/2019 |
| GB | 1000017 A | 8/1965 |

OTHER PUBLICATIONS

Partial European Search Report for EP Application No. 21154252.7 dated Sep. 7, 2021.

*Primary Examiner* — Tho V Duong
*Assistant Examiner* — Raheena R Malik
(74) *Attorney, Agent, or Firm* — Carlson, Gaskey & Olds, P.C.

(57) ABSTRACT

A heat exchanger duct includes a wall having ends spaced along a central axis. An inlet manifold is positioned within a downstream portion of the duct at a radially outward location. An outlet manifold is positioned within an upstream portion of the duct at a radially outward location. At least one of the inlet and outlet manifolds extend at least 10 degrees around the circumference of the duct. A central manifold is disposed between the inlet and outlet manifolds, and radially inwardly of the inlet and outlet manifolds. Heat exchanger entrance elements extend radially inward from the inlet manifold to the central manifold, and heat exchanger exit elements extend radially outward from the central manifold to the outlet manifold. A gas turbine engine is also disclosed.

19 Claims, 8 Drawing Sheets

(56) References Cited

U.S. PATENT DOCUMENTS

| | | | |
|---|---|---|---|
| 5,117,904 A * | 6/1992 | Bond | F28F 9/22 |
| | | | 165/163 |
| 7,128,136 B2 * | 10/2006 | Gregory | F28F 1/40 |
| | | | 29/890.047 |
| 10,126,062 B2 * | 11/2018 | Cerny | F01D 25/12 |
| 11,441,850 B2 * | 9/2022 | Colson | B33Y 80/00 |
| 11,530,645 B2 * | 12/2022 | Nicolinco | F02C 7/12 |
| 2006/0108108 A1 | 5/2006 | Naukkarinen et al. | |
| 2008/0014078 A1 * | 1/2008 | Suciu | F02K 3/068 |
| | | | 415/180 |
| 2008/0087023 A1 * | 4/2008 | Suciu | F01D 25/28 |
| | | | 60/797 |
| 2009/0019858 A1 * | 1/2009 | Roberge | F02C 3/073 |
| | | | 60/785 |
| 2009/0180939 A1 | 7/2009 | Hagen et al. | |
| 2010/0116481 A1 | 5/2010 | Evans et al. | |
| 2015/0107804 A1 | 4/2015 | Glass et al. | |
| 2015/0377135 A1 | 12/2015 | Kupiszewski | |
| 2016/0290226 A1 * | 10/2016 | Roberge | F02C 3/10 |
| 2018/0051935 A1 * | 2/2018 | Roberge | F28D 9/0018 |
| 2021/0247152 A1 * | 8/2021 | Roberge | F28D 7/1638 |

\* cited by examiner

DUCT MOUNTED HEAT EXCHANGER

STATEMENT REGARDING FEDERALLY SPONSORED RESEARCH OR DEVELOPMENT

This invention was made with Government support awarded by the United States. The Government has certain rights in this invention.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Heat exchangers are useful for any number of fluid cooling and heating applications in a gas turbine engine.

SUMMARY

In a featured embodiment, a heat exchanger includes a duct. The duct includes a wall having a first and a second end spaced along a central axis. The first end is in fluid communication with an upstream first fluid source and the second end is connected with a downstream destination for the first fluid source. An inlet manifold is positioned within a downstream portion of the duct at a radially outward location. The inlet manifold is connected to a second fluid source. An outlet manifold is positioned within an upstream portion of the duct at a radially outward location. The duct is enclosed, and has a circumference. At least one of the inlet and outlet manifolds extend at least 10 degrees around the circumference of the duct. A central manifold is disposed between the inlet and outlet manifolds, and radially inwardly of the inlet and outlet manifolds. Heat exchanger entrance elements extend radially inward from the inlet manifold to the central manifold, and heat exchanger exit elements extend radially outward from the central manifold to the outlet manifold. The heat exchanger entrance and exit elements extend over the circumference of the duct.

In another embodiment according to the previous embodiment, the heat exchanger entrance elements and the heat exchanger exit elements extend on an arc from the central manifold to the inlet and outlet manifolds, respectively.

In another embodiment according to any of the previous embodiments, one of the heat exchanger entrance and exit elements extend to form a clockwise arc-shape and the other of the heat exchanger entrance and exit elements extend to form a counterclockwise arc-shape.

In another embodiment according to any of the previous embodiment, the central manifold includes a plurality of individual passages.

In another embodiment according to any of the previous embodiments, the heat exchanger entrance elements and the heat exchanger exit elements are axially aligned relative to the other of the heat exchanger entrance elements and the heat exchanger exit elements.

In another embodiment according to any of the previous embodiments, one of the heat exchanger entrance elements and the heat exchanger exit elements is offset relative to the other of the heat exchanger entrance elements and the heat exchanger exit elements.

In another embodiment according to any of the previous embodiments, the heat exchanger entrance and exit elements are angled with respect to the central axis of the duct.

In another embodiment according to any of the previous embodiments, the heat exchanger entrance and exit elements are angled with respect to the central axis of the duct, and one the heat exchanger entrance elements and the heat exchanger exit elements is offset relative to the other of the heat exchanger entrance elements and the heat exchanger exit elements.

In another embodiment according to any of the previous embodiments, the plurality of heat exchanger elements include heat exchanger enhancement elements.

In another embodiment according to any of the previous embodiments, a first transition manifold is positioned intermediate the inlet and outlet manifolds, and a second transition manifold is positioned upstream in the duct of the first transition manifold, and downstream in the duct of the outlet manifold.

In another embodiment according to any of the previous embodiments, a first flow divider is positioned between the inlet manifold and the first transition manifold, and a second flow divider is positioned between the outlet manifold and the second transition manifold.

In another embodiment according to any of the previous embodiments, at least one of the first and second transition manifolds extend at least 10 degrees around the circumference of the duct.

In another embodiment according to any of the previous embodiments, the duct is circular in cross-section.

In another embodiment according to any of the previous embodiments, the inlet and outlet manifolds extend about 360 degrees of the circumference of the duct.

In another featured embodiment, a gas turbine engine includes a fan, a bypass duct, a compressor, and a heat exchanger which includes a duct. The duct includes a wall having a first and a second end spaced along a central axis. The first end is in fluid communication with the bypass duct, and the second end is connected with a downstream destination for the first fluid source. An inlet manifold is positioned within a downstream portion of the duct at a radially outward location. The inlet manifold is connected to a second fluid source. An outlet manifold is positioned within an upstream portion of the duct at a radially outward location. The duct is enclosed, and has a circumference. Both the inlet and outlet manifolds extend over the circumference of the duct. A central manifold is disposed between each of the inlet and outlet manifolds, and radially inwardly of the inlet and outlet manifold. Heat exchanger entrance elements extend radially inward from the inlet manifold to the central manifold, and heat exchanger exit elements extend radially outward from the central manifold to the outlet manifold. The heat exchanger entrance and exit elements extend over the circumference of the duct.

In another embodiment according to the previous embodiment, the second fluid source is air from the compressor.

In another embodiment according to any of the previous embodiments, the outlet manifold is connected to an air cycle machine.

In another embodiment according to any of the previous embodiments, the heat exchanger entrance elements and the heat exchanger exit elements extend on an arc from the central manifold to the inlet and outlet manifolds, respectively.

In another embodiment according to any of the previous embodiments, a first transition manifold is positioned intermediate the inlet and outlet manifolds, and a second transition manifold is positioned upstream in the duct of the first transition manifold, and downstream in the duct of the outlet manifold.

In another embodiment according to any of the previous embodiments, the duct is circular in cross-section, and the inlet and outlet manifolds extend about 360 degrees of the circumference.

These and other features will be best understood from the following specification and drawings.

DETAILED DESCRIPTION

Figure 1:
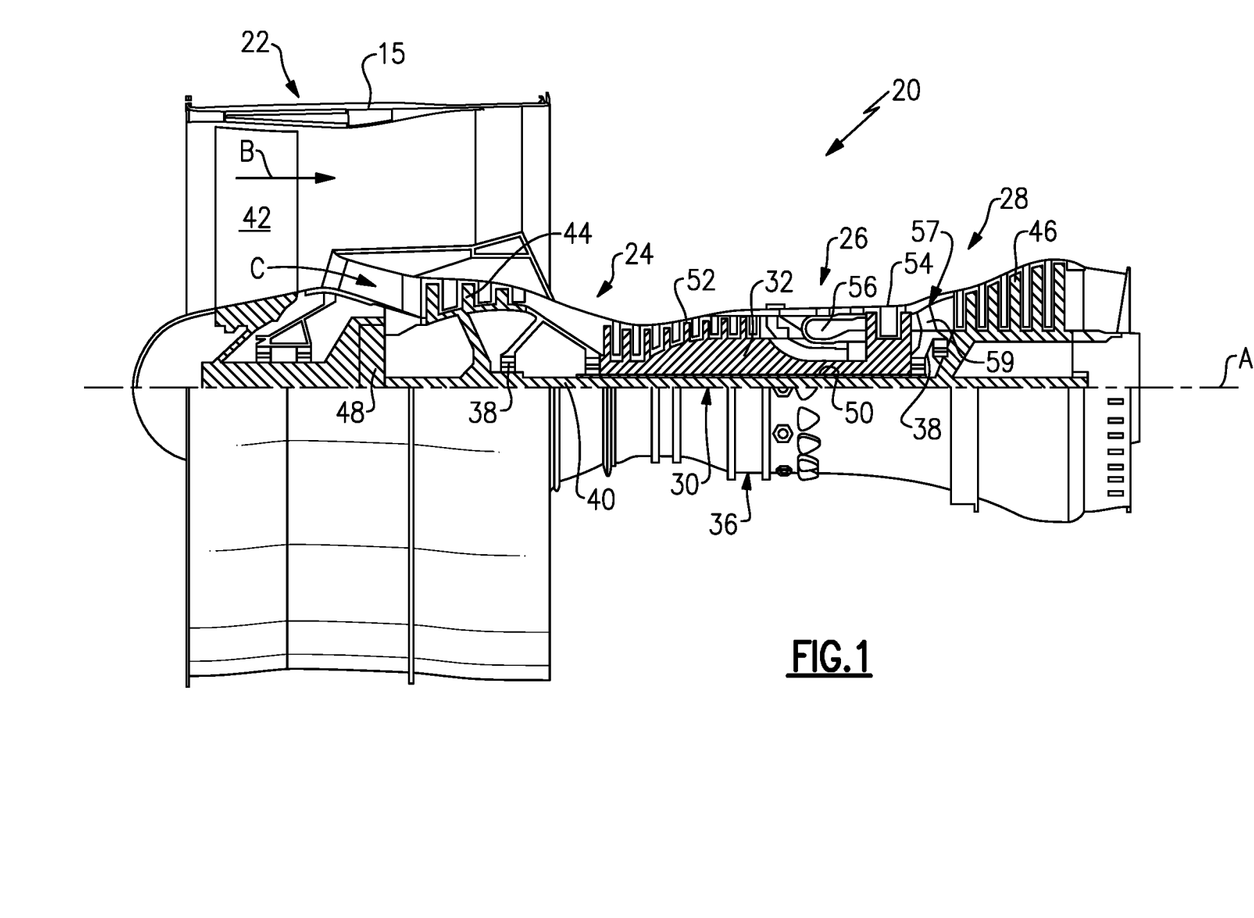
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3, and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
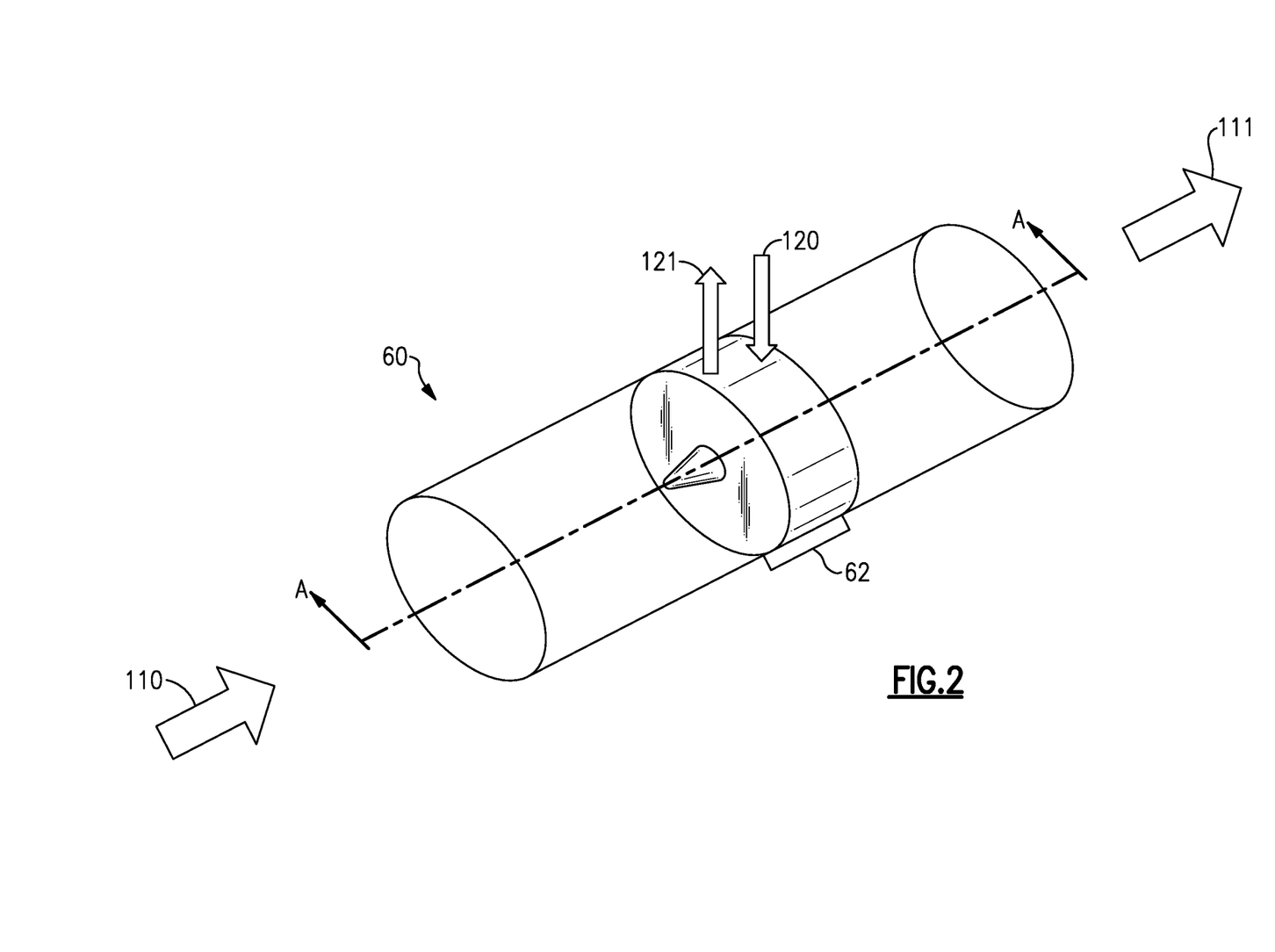
FIG. 2 is a schematic view of an example duct according to a first non-limiting example.

FIG. 2 schematically illustrates a duct 60 having a full-flow heat exchanger 62. An inlet shows duct flow 110 passes over the heat exchanger 62 and flows out at 111. The duct 60 can be circular in cross-section.

The flows 110, 111 can be bypass air such as shown in FIG. 1. In other examples, the flows 110, 111 can be bleeds consisting of flow extracted from the low pressure compressor 44 or the high pressure compressor 52. The heat exchanger 62 may cool any number of fluids. In one example, the heat exchanger can cool compressed air for use on an air cycle machine to provide air for use on the aircraft. In other embodiments the heat exchanger 62 can cool engine oil or engine fuel.

A metal heat exchanger is preferred. Heat exchanger alloys can include nickel alloys (IN625, IN718, Waspaloy, Haynes 282, etc.) cobalt alloys (Haynes 188, etc.) titanium alloys (Ti—6Al—4V, Ti—6Al—25n—4Zr—2Mo—Si, etc.), aluminum alloys and combinations thereof. The heat exchanger can be manufactured using additive manufacturing by direct metal laser sintering (DMLS), for example, and/or other processes known in the art. Heat exchanger elements typically utilize curvature to reduce steady state and transient thermally induced stress/strain so additive manufacturing can enable integral features and variation with minimal cost. Curvature can also increase the surface area for available cooling as the flow 110 interacts with the fluid being heated or cooled.

Figure 3:
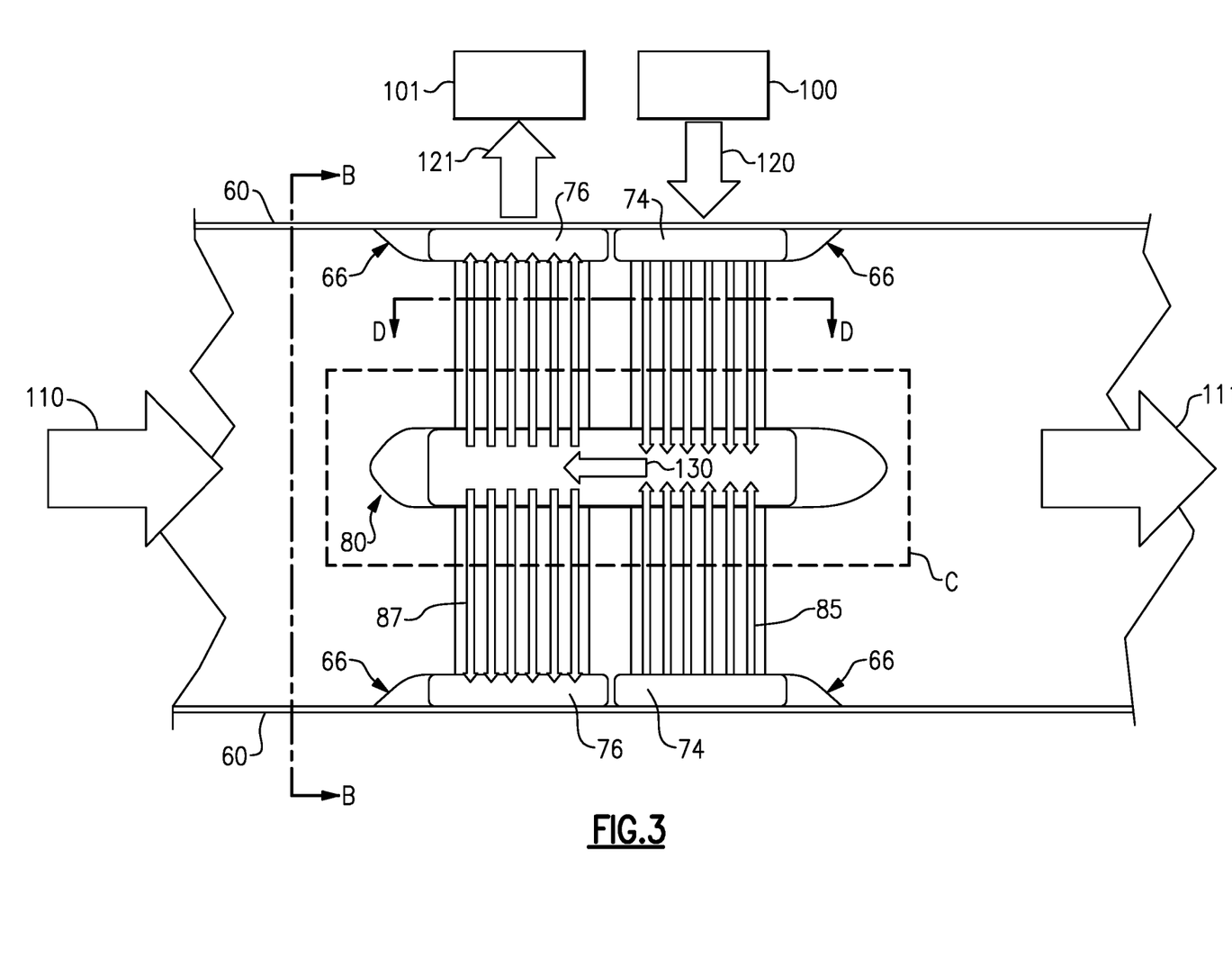
FIG. 3 illustrates a cross-sectional view taken along line A-A of FIG. 2.

A more detailed view of the full-flow heat exchanger 62 and the duct 60 is shown in FIG. 3. An inlet manifold 74 is positioned within a downstream portion of the duct 60 at a radially outward location. Similarly, an outlet manifold 76 is positioned within an upstream portion of the duct 60 at a radially outward location. The full-flow heat exchanger 62 uses inlet and outlet manifolds configured to capture fluid before and after passing through the full-flow heat exchanger 62. The fluid can be air, oil or other fluids. At least one of the inlet and outlet manifolds 74, 76 extend at least 10 degrees about the circumference of the duct 60. In one embodiment they each extend at least 180 degrees about the circumference of the duct 60, and in another embodiment they surround the entire circumference of the duct 60.

In some embodiments, there are multiple manifolds where each of the manifolds extend around the entire circumference of the duct.

Fairings 66 are attached to each of the inlet and outlet manifolds 74, 76 such that an additional connection to the duct 60 is provided. The fairings 66 can be placed in such a way that helps to minimize airflow and/or fluid pressure loss at all airflow conditions. Other devices known in the art can also be added to further guide airflow.

Heat exchange entrance elements 85 extend radially inward from the inlet manifold 74. Similarly, heat exchange exit elements 87 extend radially outward to the outlet manifold 76. As illustrated in FIG. 3, the heat exchanger elements 85, 87 can readily transport fluid to and from a central manifold 80.

In this example, an engine component 100 passes fluid flow 120 radially to the inlet manifold 74. The flow passes through the heat exchanger entrance elements 85 and enters the central manifold 80. Fluid flows in an upstream direction 130. During operation, the duct flow 110 flows over the central manifold 80 and the heat exchanger elements 85, 87 to externally cool the fluid. The fluid flow is then passed radially outward to outlet manifold 76 through the heat exchanger exit elements 87. Fluid flow 121 passes to an intended engine component 101 through one or more connections to the outlet manifold 76. The arrows should be understood as fluid conduits.

Figure 4:
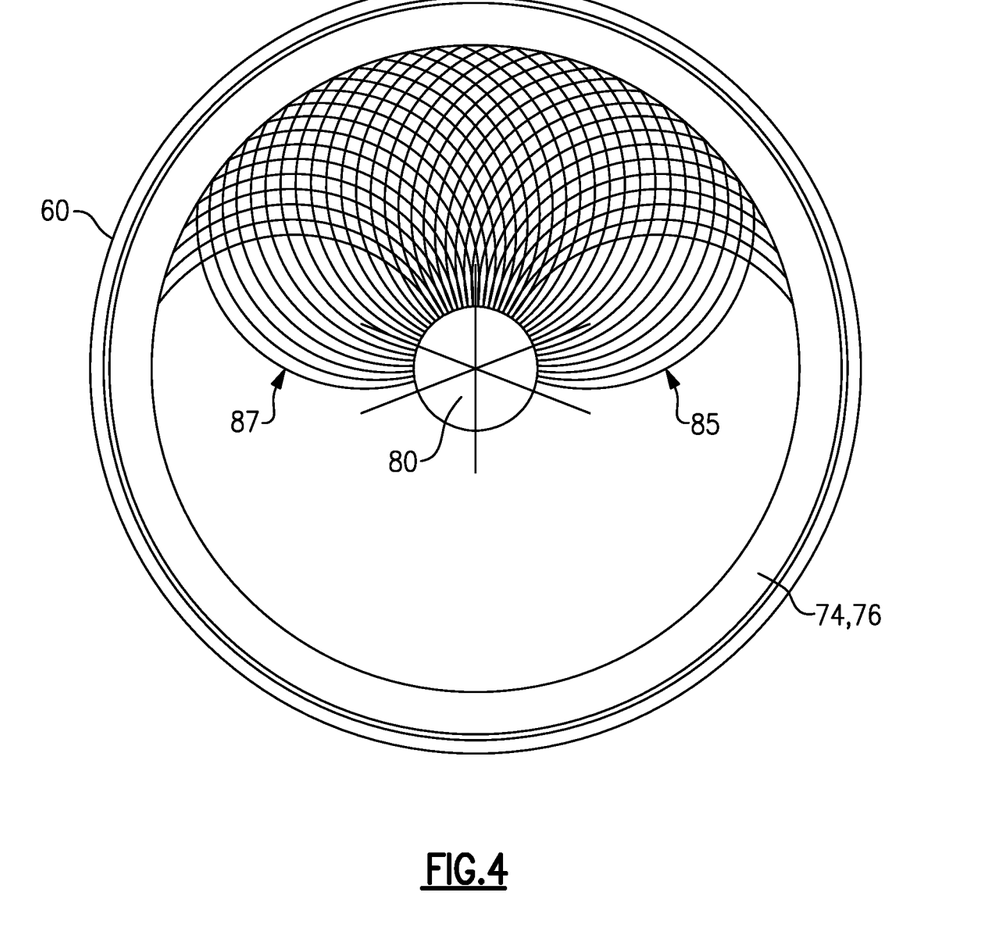
FIG. 4 illustrates a cross-sectional view taken along line B-B of FIG. 3.

In FIG. 4, the heat exchanger entrance elements 85 extend from the central manifold 80 to the inlet manifold 74 such that a directionally clockwise arc-shape is defined. Conversely, the heat exchanger exit elements 87 extend from the central manifold 80 to the outlet manifold 76 such that a directionally counterclockwise arc-shape is defined. As is clear from FIG. 4, the direction of the arc-shape of each of the heat exchanger elements 85 and 87 is evaluated from the same location. The arc-shape geometries allow for differential steady-state, transient thermal, and pressure induced radial growth to be accommodated via change in radius of curvature within the heat exchanger elements 85, 87. The arc-shaped geometries can also generate a considerable increase in surface area for heat transfer between fluids as the length of the arc-shapes can be longer than the radial distance between the central manifold 80, and the inlet manifold 74 or the outlet manifold 76. Note, the heat exchanger elements 85, 87 will be formed about the entire circumference of the duct 60. They are illustrated only over a limited portion to better illustrate the shape.

As shown, the duct 60 may be circular in cross-section, although other enclosed shapes may be utilized.

Figure 5:
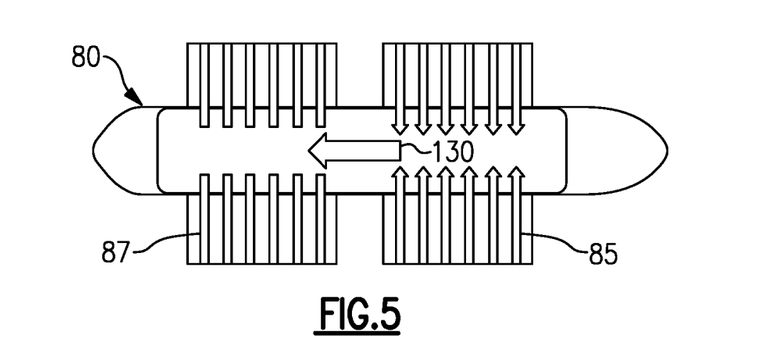
FIG. 5 illustrates a view of section C of FIG. 3.

FIG. 5 further details the transition of flow from within the central manifold 80. The central manifold 80 can be positioned offset from a central axis of the duct 60. That is, the term "central" does not require exact centering. In FIG. 5, as one example of a mixed two-pass heat transfer system, the central manifold 80 is open (passive, unforced or undirected flow interaction), thus, allowing fluid through the heat exchange entrance elements 85 to combine prior to discharging through the heat exchanger exit elements 87.

Figure 6:
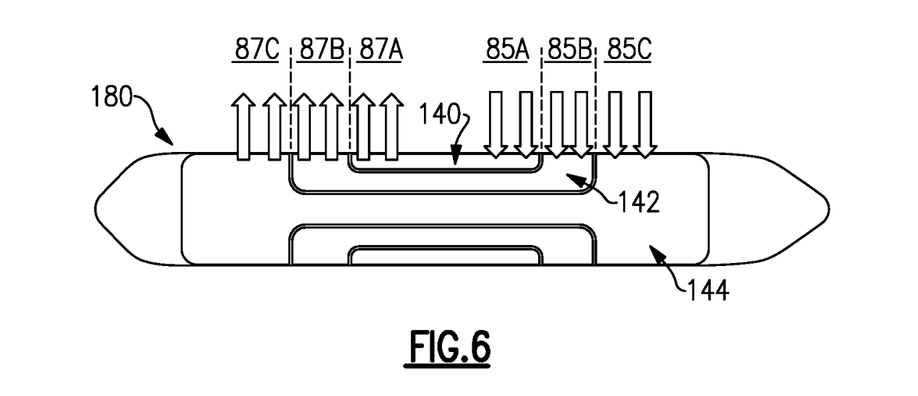
FIG. 6 illustrates an alternative embodiment of section C of FIG. 3.

Alternatively, FIG. 6 illustrates a central manifold 180 having individual passages 140, 142, 144 allowing for a mixed two-pass heat transfer. Heat exchanger entrance elements 85A-85C and heat exchanger exit elements 87A-87C are similar to the heat exchanger entrance and exit elements described above unless stated otherwise.

In this example, fluid flows radially inward into the passage 140 through the heat exchanger entrance elements 85A, flows in an upstream direction, and is passed radially outward through the heat exchanger exit elements 87A. Similarly, the passage 142 passes fluid in an upstream direction from the heat exchanger entrance elements 85B to the heat exchanger exit elements 87B, and the passage 144 passes fluid in an upstream direction from the plurality of heat exchanger entrance elements 85C to the plurality of heat exchanger exit elements 87C.

Figure 7:
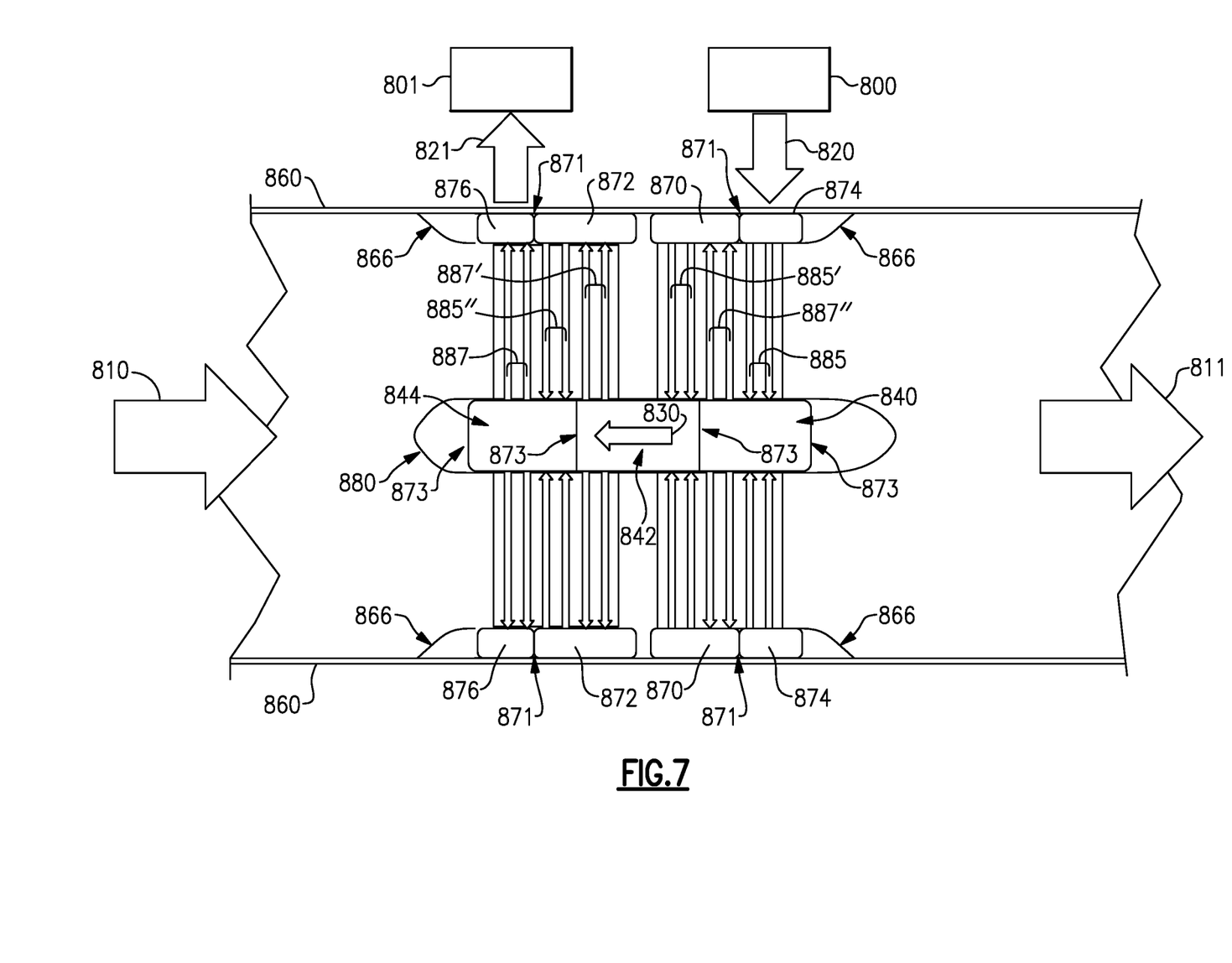
FIG. 7 is a schematic view of another example duct.

FIG. 7 illustrates another example of a full-flow heat exchanger. The full-flow heat exchanger shown in FIG. 7 is similar to the full-flow heat exchanger 62 except where described or shown differently. Like reference numerals designate like elements where appropriate with a leading "8."

An inlet shows duct flow 810 passes over the heat exchanger and flows out at 811. Duct 860 can be circular in cross-section, although other enclosed shaped may be used. An inlet manifold 874 is positioned within a downstream portion of the duct 860 at a radially outward location. Similarly, an outlet manifold 876 is positioned within an upstream portion of the duct 860 at a radially outward location. At least one of the inlet and outlet manifolds 874, 876 extend at least 10 degrees about the circumference of the duct 860. In one embodiment they each extend at least 180 degrees about the circumference of the duct 860, and in another embodiment across the entire circumference of the duct 60.

Fairings 866 are attached to each of the inlet and outlet manifolds 874, 876 such that an additional connection to the duct 860 is provided.

Heat exchange entrance elements 885 extend radially inward from the inlet manifold 874 to a central manifold 880. Similarly, heat exchange exit elements 887 extend radially outward from the central manifold to the outlet manifold 876.

Notably, unlike FIG. 3, in FIG. 7, flow dividers 871 define a point of separation between the inlet and outlet manifolds 874, 876 and transition manifolds 870, 872, respectively. The transition manifold 870 is positioned intermediate to the inlet and outlet manifolds 874, 876. Similarly, the transition manifold 872 is positioned upstream in the duct 860 of the transition manifold 870, and downstream in the duct 860 of the outlet manifold 876.

As shown in FIG. 7, heat exchanger entrance elements 885' extend radially inward from the transition manifold 870 to the central manifold 880, and heat exchanger exit elements 887" extend radially outward from the central manifold 880 to the transition manifold 870. Equally, heat exchanger entrance elements 885" extend radially inward from the transition manifold 872 to the central manifold 880, and heat exchanger exit elements 887' extend radially outward from the central manifold 880 to the transition manifold 872.

The central manifold 880 has internal flow dividers 873 configured to define different flow passages.

In this example, an engine component 800 passes fluid flow 820 radially to the inlet manifold 874. The flow passes through the heat exchanger entrance elements 885 and enters a passage 840 of the central manifold 880. Fluid flows in an upstream direction and then radially outward through the heat exchanger exit elements 887" to the transition manifold 870 wherein the fluid is subsequently passed radially inward through the heat exchanger entrance elements 885' to a passage 842 of the central manifold 880. The fluid flows in an upstream direction 830. During operation, the duct flow 810 flows over the central manifold and the heat exchanger elements to externally cool the fluid. The fluid is then passed radially outward through the heat exchanger exit elements 887' to the transition manifold 872 wherein the fluid is subsequently passed radially inward through the heat exchanger entrance elements 885" to a passage 844 of the central manifold 880. Fluid flows in an upstream direction and then radially outward through the heat exchanger exit elements 887 to the outlet manifold 876. Fluid flow 821 passes to an intended engine component 801 through one or more connections to the outlet manifold 876. This embodiment utilizes a multi-pass heat exchanger useful for additional heat transfer via increased fluid interaction.

It should be understood that additional transitional passageways can be added. Also, like the inlet and outlet manifolds, the transitional manifolds extend across at least 10 degrees, in one embodiment at least 180 degrees, and in another embodiment, across at least 360 degrees. The transitional entrance and exit elements are spread across the circumference of the duct.

Figure 8A:
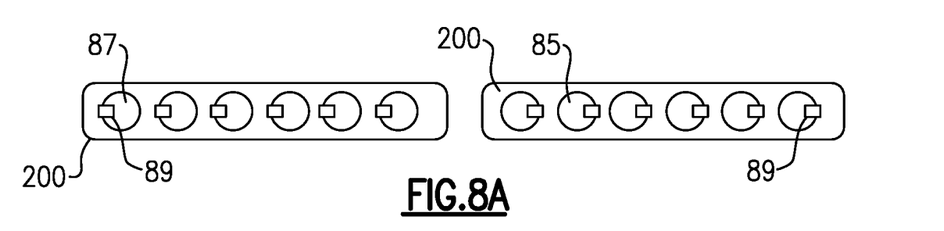
FIG. 8A illustrates an example embodiment of heat exchanger elements taken along line D-D of FIG. 3.

In FIG. 8A, the heat exchanger entrance and exit elements 85, 87 are channeled passages formed into a solid element 200. Passages 85, 87 may receive internal heat exchanger enhancement elements 89 such as pins, ribs, trip-strips, etc. The outer surface of the solid element 200 may also receive like external heat exchanger enhancement elements.

Figure 8B:
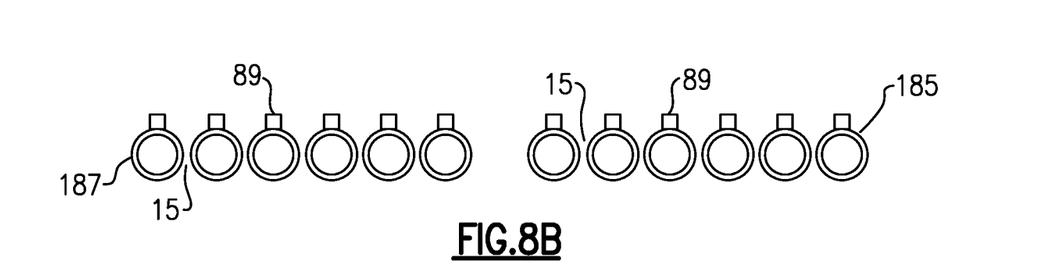
FIG. 8B illustrates another example embodiment of heat exchanger elements taken along line D-D of FIG. 3.

As shown in FIG. 8B, heat exchanger entrance and exit elements 185, 187 can include isolated passages. A space 15 is defined between each of the isolated passages 185, 187. External heat exchanger enhancements elements 189 can be installed external to the passages. Note, the isolated passages 185 may also receive like internal heat exchanger enhancement elements.

Figure 8C:
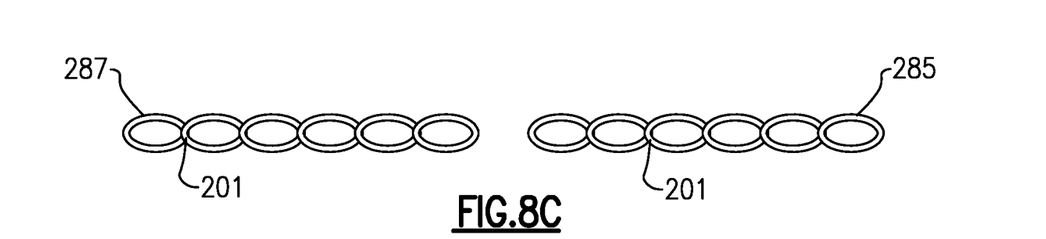
FIG. 8C illustrates another example embodiment of heat exchanger elements taken along line D-D of FIG. 3.

In FIG. 8C, heat exchanger entrance and exit elements 285, 287 can include connection features 201 that allow the elements 285, 287 to be coupled together.

Figure 8D:
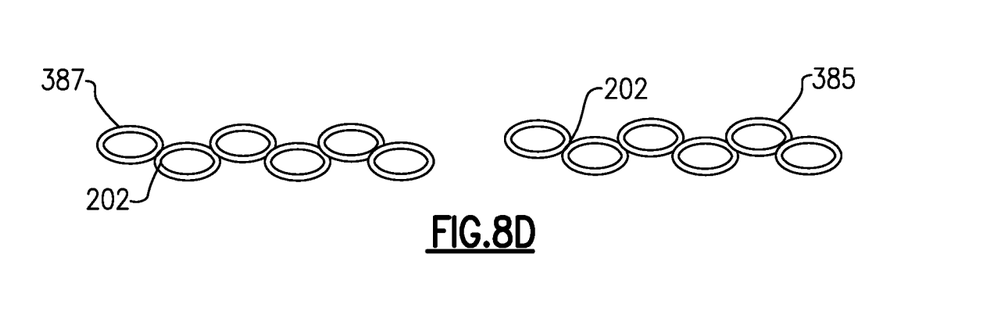
FIG. 8D illustrates another example embodiment of heat exchanger elements taken along line D-D of FIG. 3.

As shown in FIG. 8D, heat exchanger entrance and exit elements 385, 387, coupled together at 202, can be offset such that a wave form is defined.

Figure 9A:
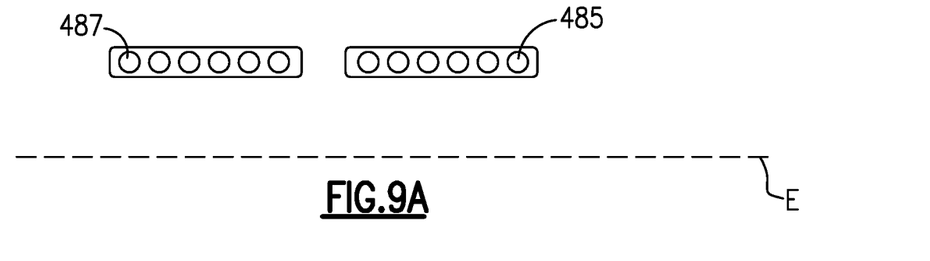
FIG. 9A illustrates another example embodiment of heat exchanger elements taken along line D-D of FIG. 3.

In FIG. 9A, heat exchange entrance and exit elements 485, 487 can be axially aligned to the other with respect to the duct central line E.

Figure 9B:
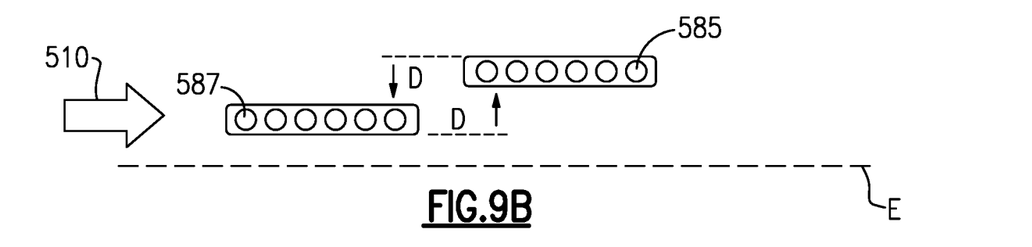
FIG. 9B illustrates another example embodiment of heat exchanger elements taken along line D-D of FIG. 3.

Alternatively, as shown in FIG. 9B, heat exchanger entrance and exit elements 585, 587 can be offset to the other such that a radial offset D is defined. The offset orientation is configured such that as flow 510 passes through the duct, the heat exchanger entrance elements 585 are not directly in wake of the heat exchanger exit elements 587. "Wake" referring to disrupted flow downstream the duct.

Figure 9C:
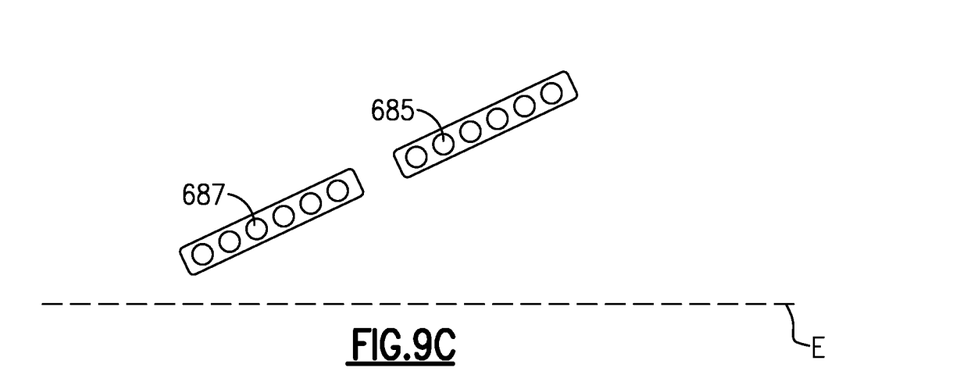
FIG. 9C illustrates another example embodiment of heat exchanger elements taken along line D-D of FIG. 3.

As shown in FIG. 9C heat exchanger entrance and exit elements 685, 687 can be angled with respect to the duct central line E.

Figure 9D:
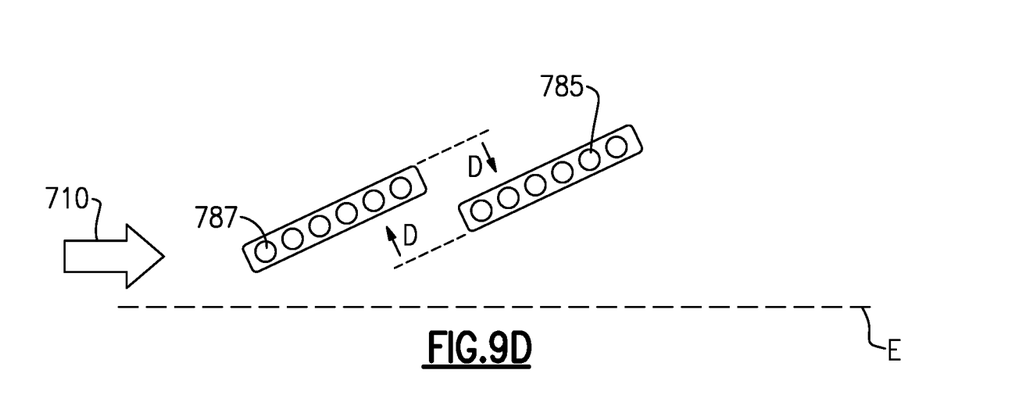
FIG. 9D illustrates another example embodiment of heat exchanger elements taken along line D-D of FIG. 3.

Alternatively, as shown in FIG. 9D, heat exchanger entrance and exit elements 785, 787 can be angled and offset such that an offset R is defined. Similar to FIG. 9B, offsetting the elements 785, 787 helps eliminate waking as flow 710 passes through the duct.

Angled, as described above, should be understood as an angle that is non-parallel and/or non-perpendicular to the duct center line E.

It should also be understood that the geometries, orientations, and features described in FIGS. 8A-9D can be applied, respectively, to the heat exchanger elements of FIG. 7.

The above described examples provide a full-flow heat exchanger design compatible with integrated duct placement. The design of the heat exchanger allows for efficient heat transfer and system performance by enabling improved architecture for weight, and lowered costs due to the elimination of other flow guiding systems. Maintainability is enhanced due to external (to engine) ducts with an integrated heat exchanger that is more accessible for inspection and replacement. External ducts also allow prompt modifications for the increase or reduction in heat transfer. Contrarily, other heat exchangers known in the art are typically buried within engine cases or fan ducts.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A heat exchanger comprising:
   a duct comprising:
      a wall having a first and a second end spaced along a central axis, the first end to be in fluid communication with an upstream first fluid source, and the second end being connected with a downstream destination for the first fluid source;
      an inlet manifold positioned within a downstream portion of the duct at a radially outward location, the inlet manifold to be connected to a second fluid source;
      an outlet manifold positioned within an upstream portion of the duct at a radially outward location;
      the duct being enclosed, and having a circumference, wherein at least one of the inlet and outlet manifolds extend at least 10 degrees around the circumference of the duct;
      a central manifold disposed between the inlet and outlet manifolds, and radially inwardly of the inlet and outlet manifolds;
      wherein heat exchanger entrance elements extend radially inward from the inlet manifold to the central manifold, and heat exchanger exit elements extend radially outward from the central manifold to the outlet manifold, the heat exchanger entrance and exit elements extending over the circumference of the duct;
      wherein the heat exchanger entrance elements and the heat exchanger exit elements extend on an arc from the central manifold to the inlet and outlet manifolds, respectively; and
      wherein one of the heat exchanger entrance and exit elements extend from the central manifold to one of the inlet and outlet manifolds to form a clockwise arc-shape and the other of the heat exchanger entrance and exit elements extend from the central manifold to one of the inlet and outlet manifolds to form a counterclockwise arc-shape.

2. The heat exchanger as recited in claim 1, wherein the central manifold includes a plurality of individual passages.

3. The heat exchanger as recited in claim 1, wherein the heat exchanger entrance elements and the heat exchanger exit elements are axially aligned relative to the other of the heat exchanger entrance elements and the heat exchanger exit elements.

4. The heat exchanger as recited in claim 1, wherein one of the heat exchanger entrance elements and the heat exchanger exit elements is offset relative to the other of the heat exchanger entrance elements and the heat exchanger exit elements.

5. The heat exchanger as recited in claim 1, wherein the heat exchanger entrance and exit elements are angled with respect to the central axis of the duct.

6. The heat exchanger as recited in claim 1, wherein the heat exchanger entrance and exit elements are angled with respect to the central axis of the duct, and one the heat exchanger entrance elements and the heat exchanger exit elements is offset relative to the other of the heat exchanger entrance elements and the heat exchanger exit elements.

7. The heat exchanger as recited in claim 1, wherein the plurality of heat exchanger elements include heat exchanger enhancement elements.

8. The heat exchanger as recited in claim 1, wherein a first transition manifold is positioned in the duct intermediate the inlet and outlet manifolds, and a second transition manifold is positioned in the duct upstream of the first transition manifold, and downstream of the outlet manifold.

9. The heat exchanger as recited in claim 8, wherein a first flow divider is positioned between the inlet manifold and the first transition manifold, and a second flow divider is positioned between the outlet manifold and the second transition manifold.

10. The heat exchanger as recited in claim 8, wherein at least one of the first and second transition manifolds extend at least 10 degrees around the circumference of the duct.

11. The heat exchanger as recited in claim 1, wherein the duct is circular in cross-section.

12. The heat exchanger as recited in claim 11, wherein the inlet and outlet manifolds extend about 360 degrees of the circumference of the duct.

13. The heat exchanger as recited in claim 1, wherein said heat exchanger entrance elements are each passages formed into a solid element and said heat exchanger exit elements are each passages formed into a solid element.

14. The heat exchanger as recited in claim 1, wherein the arc-shape of the one of the heat exchanger entrance and exit elements and the other of the heat exchanger entrance and exit element are each evaluated from a common location.

15. A gas turbine engine comprising:
   a fan;
   a bypass duct;
      a compressor;
      a heat exchanger comprising:
         a duct comprising:
            a wall having a first and a second end spaced along a central axis, the first end to be in fluid communication with the bypass duct, and the second end being connected with a downstream destination for the first fluid source;
            an inlet manifold positioned within a downstream portion of the duct at a radially outward location, the inlet manifold to be connected to a second fluid source;
            an outlet manifold positioned within an upstream portion of the duct at a radially outward location;
            the duct being enclosed, and having a circumference, wherein both the inlet and outlet manifolds extend over the circumference of the duct;
            a central manifold disposed between each of the inlet and outlet manifolds, and radially inwardly of the inlet and outlet manifold;
            wherein heat exchanger entrance elements extend radially inward from the inlet manifold to the central manifold, and heat exchanger exit elements extend radially outward from the central manifold to the outlet manifold, the heat exchanger entrance and exit elements extending over the circumference of the duct
         wherein the heat exchanger entrance elements and the heat exchanger exit elements extend on an arc from the central manifold to the inlet and outlet manifolds, respectively; and
         wherein one of the heat exchanger entrance and exit elements extend from the central manifold to one of the inlet and outlet manifolds to form a clockwise arc-shape and the other of the heat exchanger entrance and exit elements extend from the central manifold to one of the inlet and outlet manifolds to form a counterclockwise arc-shape.

16. The gas turbine as recited in claim 15, wherein the second fluid source is air from the compressor.

17. The gas turbine as recited in claim 16, wherein the outlet manifold is connected to an air cycle machine.

18. The gas turbine as recited in claim 15, wherein a first transition manifold is positioned in the duct intermediate the inlet and outlet manifolds, and a second transition manifold is positioned in the duct upstream of the first transition manifold, and downstream of the outlet manifold.

19. The gas turbine as recited in claim 15, wherein the duct is circular in cross-section, and the inlet and outlet manifolds extend about 360 degrees of the circumference.

* * * * *